(12) United States Patent
Yamazaki et al.

(10) Patent No.: US 7,861,125 B2
(45) Date of Patent: Dec. 28, 2010

(54) DATA PROCESSING APPARATUS, CONTROL METHOD THEREOF, AND IMAGE PROCESSING APPARATUS

(75) Inventors: Michihiro Yamazaki, Saitama (JP); Shinichi Murayama, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 530 days.

(21) Appl. No.: 11/907,607

(22) Filed: Oct. 15, 2007

(65) Prior Publication Data

US 2008/0184076 A1 Jul. 31, 2008

(30) Foreign Application Priority Data

Jan. 29, 2007 (JP) ............... 2007-017343

(51) Int. Cl.
*G06F 11/00* (2006.01)
(52) U.S. Cl. .............. 714/47; 714/33; 714/39
(58) Field of Classification Search .......... 714/26, 714/33, 39, 47
See application file for complete search history.

(56) References Cited

U.S. PATENT DOCUMENTS

| | | | | |
|---|---|---|---|---|
| 5,740,490 | A * | 4/1998 | Yamashita et al. ............. | 399/8 |
| 6,012,152 | A * | 1/2000 | Douik et al. .................. | 714/26 |
| 6,018,785 | A * | 1/2000 | Wenniger ................... | 710/200 |
| 6,587,955 | B1 * | 7/2003 | Foote et al. ................. | 713/400 |
| 6,718,490 | B1 * | 4/2004 | Takemoto et al. ............. | 714/47 |
| 6,915,173 | B2 * | 7/2005 | Chan et al. ................... | 700/44 |
| 7,058,860 | B2 * | 6/2006 | Miller et al. .................. | 714/47 |
| 7,107,491 | B2 * | 9/2006 | Graichen et al. .............. | 714/37 |
| 7,181,651 | B2 * | 2/2007 | Gross et al. ................... | 714/37 |
| 7,506,215 | B1 * | 3/2009 | Maw et al. .................... | 714/47 |
| 7,523,357 | B2 * | 4/2009 | Irby et al. ..................... | 714/47 |
| 7,555,499 | B2 * | 6/2009 | Shah et al. ........................ | 1/1 |
| 2003/0097618 | A1 * | 5/2003 | Kim et al. .................... | 714/39 |
| 2005/0114739 | A1 * | 5/2005 | Gupta et al. .................. | 714/39 |
| 2007/0055914 | A1 * | 3/2007 | Chandwani et al. .......... | 714/47 |
| 2007/0157091 | A1 * | 7/2007 | Wadhwa ..................... | 715/705 |
| 2007/0220353 | A1 * | 9/2007 | Iura et al. ..................... | 714/39 |
| 2008/0126881 | A1 * | 5/2008 | Bruckhaus .................. | 714/47 |

FOREIGN PATENT DOCUMENTS

| | | |
|---|---|---|
| JP | A 2001-166968 | 6/2001 |
| JP | A 2002-157147 | 5/2002 |

* cited by examiner

*Primary Examiner*—Joshua A Lohn
(74) *Attorney, Agent, or Firm*—Oliff & Berridge, PLC (57) ABSTRACT

A image data processing apparatus comprises: a user interface; an input device; a processor that converts original data; a first monitoring unit that monitors operation of the user interface or the input device; a second monitoring unit that monitors processing of the processor; a first storage unit that sequentially stores in chronological order at least one of operating records and processing records; an error detecting unit that detects an error; a second storage unit that, when an error is detected, stores determination information that includes a plurality of records that are stored in the first storage unit within a predetermined time period up until the error occurs; an error prediction unit that predicts occurrence of an error by determining whether there is agreement between the plurality of records and the determination information; and a process modifier that, when occurrence of an error is predicted, modifies the processing of the processor.

5 Claims, 5 Drawing Sheets

DATA PROCESSING APPARATUS, CONTROL METHOD THEREOF, AND IMAGE PROCESSING APPARATUS

CROSS-REFERENCE TO RELATED APPLICATIONS

This application is based on and claims priority under 35 USC 119 from Japanese Patent Application No. 2007-17343 filed on Jul. 3, 2007.

BACKGROUND

1. Technical Field

The present invention relates to a data processing apparatus and image processing apparatus capable of avoiding an error and continuing a processing operation.

2. Related Art

An image processing apparatus is known that converts image data so as to output it by a suitable format. For example, the apparatus is built into a multifunction machine having functions of a printer, facsimile, copier, and scanner and the like.

In recent years, a program that performs complicated functions such as interruption processing or print status setting is implemented in the image processing apparatus according to commercial needs. As the program generally includes larger amount of codes, it is more difficult to thoroughly find bugs and finish debugging before shipment of the apparatus. In other words, the apparatus has a risk of errors occurring during operation.

SUMMARY

According to an aspect of the invention, there is provided a data processing apparatus comprising: a user interface that enables a user to input original data; an input device that receives original data; a processor that converts the original data input via the user interface or by the input device, so as to generate output data; a first monitoring unit that monitors operation of the user interface or the input device; a second monitoring unit that monitors processing of the processor; a first storage unit that sequentially stores in chronological order at least one of operating records representative of an operation history of a user and processing records representative of a process sequence of the processor; an error detecting unit that detects an error occurring in the second monitoring unit; a second storage unit that, when an error is detected by the error detection unit, stores determination information that includes a plurality of records that are stored in the first storage unit within a predetermined time period up until the error occurs, the plurality of records being arranged in chronological order; an error prediction unit that predicts occurrence of an error by determining whether there is agreement between the plurality of records sequentially stored in the first storage unit and the determination information stored in the second storage unit; and a process modifier that, when occurrence of an error is predicted by the error prediction unit, modifies the processing of the processor so as to cause the processor to become noncompliant to the records included in the determination information.

BRIEF DESCRIPTION OF THE DRAWINGS

Exemplary embodiments of the present invention will be described in detail based on the following figures, wherein.

DETAILED DESCRIPTION

Following is a description of exemplary embodiments of the present invention, with reference to the accompanying drawings.

(1) Configuration of Multifunction Machine

Figure 1:
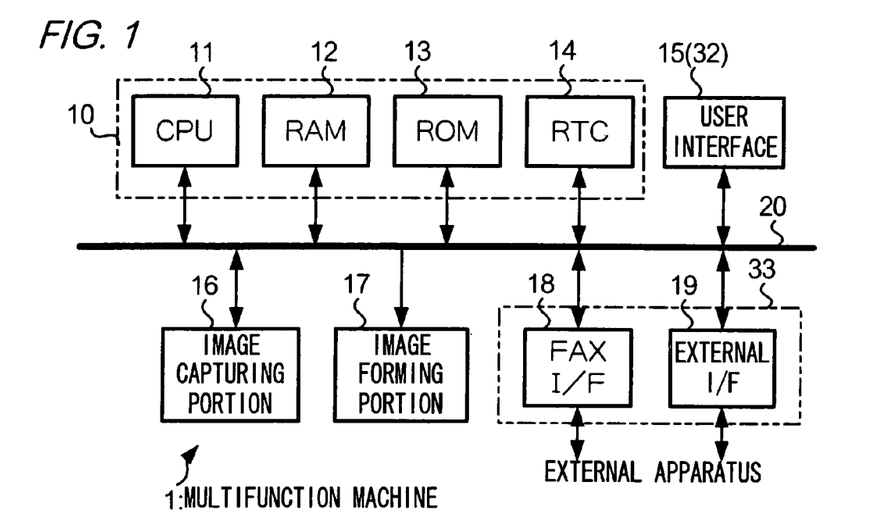
FIG. 1 shows the configuration of a multifunction machine according to an exemplary embodiment of the present invention.

In the present exemplary embodiment, an example of a multifunction machine provided with a data processing apparatus will be described. FIG. 1 shows the hardware configuration of a multifunction machine according to an exemplary embodiment of the present invention. This multifunction machine 1 includes the functions of a printer, a copy machine, a fax machine, and a scanner. The multifunction machine 1 is characterized in that it performs error avoidance processing, which is a distinguishing aspect of the present invention.

As shown in FIG. 1, the multifunction machine 1 is provided with a controller 10, a user interface 15, an image capturing portion 16, an image forming portion 17, a fax interface 18, and an external interface 19.

The controller 10 has a CPU (Central Processing Unit) 11, a RAM (Random Access Memory) 12, a ROM (Read Only Memory) 13, and an RTC (Real Time Clock) 14.

In the ROM 13, various programs and parameters are stored, and by the CPU 11 reading out a stored program to a work area of the RAM 12, various processing is performed to perform control of each portion of the multifunction machine 1 via a bus 20 according to the results of processing. Among the various programs are an image processing program for image processing as data processing, a program for allowing operation of functions such as printing, copying, faxing, and scanning, and an error avoidance program that avoids errors. In the RAM 12, other than the work area, an area is insured where operating records, processing records, determination information and the like are stored.

The RTC 14 generates a clock time, and adds this clock time to the operating records and processing records.

The user interface 15 is, for example, configured with a liquid crystal display or the like, and is configured with a display that displays a message, an image indicating a work status, or the like to a user according to control signals from the controller 10, a numeric keypad, a start button, a stop button, and a touch panel provided on the liquid crystal display (none of these are shown). The user interface 15 is an operating unit 32 (see FIG. 2) that outputs signals according to operating input of the user and a display screen at the time of the operating input, and outputs a job signal described below to the multifunction machine 1.

The image capturing portion 16 optically scans an original such as a document to capture an image of the original. The image capturing portion 16 is provided with a mounting portion (not shown) where an original is mounted, and optically scans an original that has been mounted to capture an image of the original, and generates picture data that is binary bitmap data.

The image forming portion 17 prints image data generated from the picture data. The image forming portion 17 irradiates image light onto an unshown photosensitive drum based on image data supplied by the controller 10 to form a latent image due to an electrostatic potential difference on the surface of the photosensitive drum, this latent image is converted to a toner image due to selective attachment of toner, and the toner image is transferred and fixed to form an image on paper.

The fax interface 18 is an interface connected to a telephone line, and the external interface 19 is an interface connected to a network. The fax interface 18 and the external interface 19 make up an external input unit 33 (see FIG. 2) that send and receive data to/from an external apparatus such as a personal computer, a fax machine, or the like.

(2) Image Processing (Data Processing)

Next is a description of image processing in the controller 10.

With this image processing, picture data captured with the image capturing portion 16, or picture data received via the interface 18 or 19, is converted to image data. As one example, with respect to picture data created with a page description language (PDL) and sent from an external apparatus such as a personal computer via the external interface 19, rendering processing is performed for each of an output unit (page unit), thus generating raster data for printing with the image forming portion 17.

This image processing includes not only conversion from picture data to image data, but also processing in which various image conversion is performed, such as when converting picture data to data for sending from the fax interface 18 to an external apparatus using a communications line.

Figure 3A:
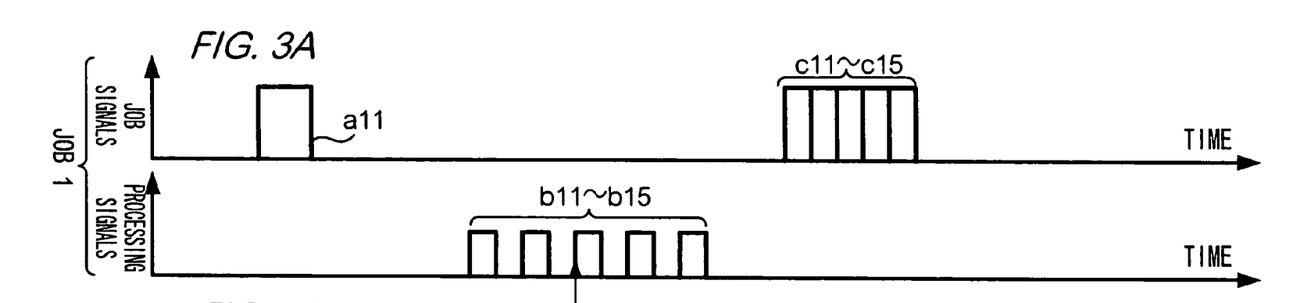
FIGS. 3A and 3B are waveform diagrams that show signals input to a processing unit in the exemplary embodiment shown in FIG. 1.

FIG. 3A shows an operation when printing a five page original using the copy function of the multifunction machine (referred to as "Job 1").

Here, a job signal in FIG. 3A is a signal when a start switch of the user interface 15 was pressed or a signal instructing the image forming portion 17 to perform printing, and a processing signal is a signal for performing rendering processing.

First, the user operates an operating switch according to an instruction displayed in the display of the user interface 15 to establish a state of waiting for copy printing. Next, the user sets an original in an automatic paper feed mechanism of the image capturing portion 16, and pushes a start switch of the user interface 15 (job signal a11). Thus, with the image capturing portion 16, the original is captured to generate picture data, and this picture data is sequentially sent. Then, with the controller 10, this data is temporarily stored in the RAM 12. Afterward, the controller 10 sequentially performs rendering processing for each page (processing signals b11 to b15), and image data for which rendering processing has finished is again stored in the RAM 12. After image data corresponding to five pages of the original has been stored in the RAM 12, the controller 10 sends these units of image data to the image forming portion 17 (job signals c11 to c15). Then, with the image forming portion 17, the image data for pages 1 to 5 is received and sequentially printed to paper.

Figure 3B:
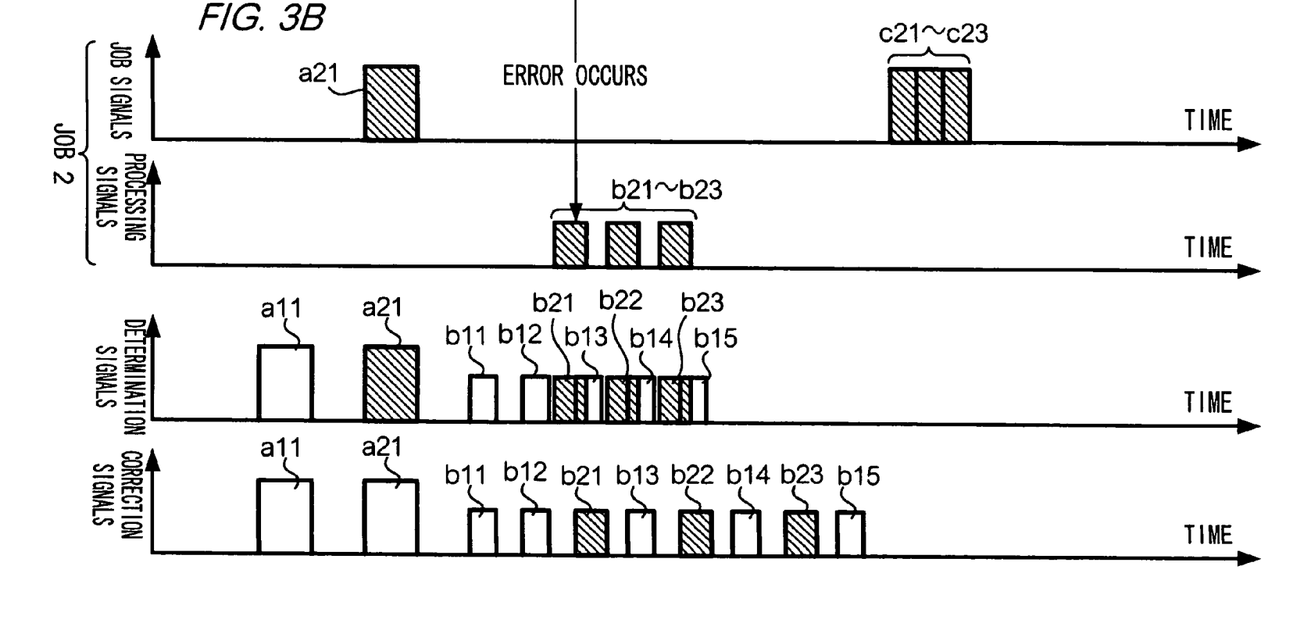

Next, FIG. 3B shows an operation when printing a three page document from an external apparatus such as a personal computer (referred to as "Job 2").

The controller 10 extracts a job signal a21 from a signal received via the external interface 19, and temporarily stores picture data in the RAM 12. Afterward, the controller 10 sequentially performs rendering processing for each page (processing signals b21 to b23), and image data for which rendering processing has finished is again stored in the RAM 12. After image data corresponding to three pages of the original has been stored in the RAM 12, the controller 10 sends these units of image data to the image forming portion 17 (job signals c21 to c23), and with the image forming portion 17, pages 1 to 3 are sequentially printed to paper.

Here, in the job signals a11 and a21, the clock time in the RTC 14, a function type, a number of pages, printing conditions, and the like are stored as information, and in the processing signals b11 to b15 and b21 to b23, a processing start time, end time, processing contents, and the like are stored as information, and in the job signals c11 to c15, clock time information, printing conditions of the image data sent to the image forming portion 17, and the like are stored as information.

The foregoing is an operation performed when executing the copy function and the printing function in the multifunction machine 1.

(3) Error Avoidance Processing (3-1) Functional Configuration

Following is a description of a case in which in the controller 10, an error avoidance processing program is read, and the program is executed.

Figure 2:
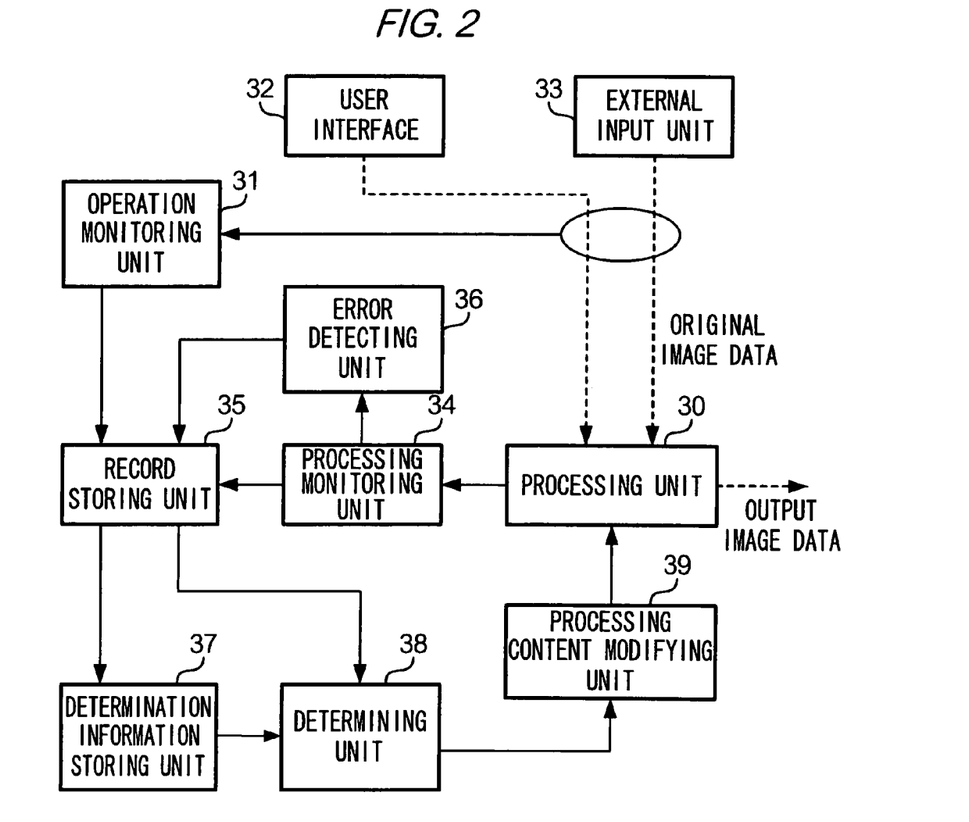
FIG. 2 is a functional block diagram for the exemplary embodiment shown in FIG. 1.

First, the functions executed by the controller 10 are shown in the functional block diagram in FIG. 2.

A processing unit 30, as stated above, has a function to perform image processing such as rendering processing that converts picture data to image data.

An operation monitoring unit 31 monitors operation in an operating unit 32 or an external input unit 33. Specifically, the operation monitoring unit 31 extracts a job signal from among signals sent to the processing unit 30 from the operating unit 32 and the external input unit 33.

A processing monitoring unit 34 monitors processing in the processing unit 30. Specifically, information processed for each page in the processing unit 30 is extracted by the processing monitoring unit 34 as a processing signal.

A record storing unit 35 sequentially stores, in chronological order, the job signal and the processing signal. The record storing unit 35, in relation to memory capacity, after a predetermined number of signals have been stored, sequentially updates by deleting in order from the oldest signal.

The specific operation of the record storing unit 35 will be described with reference to FIG. 4.

As stated above, signals like those shown in Job 1 (see FIG. 3A) and Job 2 (see FIG. 3B) are input to the processing unit 30. At this time, these signals are sequentially stored in the RAM 12 at each clock time as records including the clock time information. Also, because there is a limit to the storage capacity of the record storing unit 35, old records are sequentially deleted. As illustrated in FIG. 4, in the record storing unit 35, the records within the range of the bold frame are sequentially stored/deleted such that the bold frame is moved downward relative to the records, which are written in chronological order.

Returning to FIG. 2, an error detecting unit 36 detects that an error has occurred in the processing unit 30 in the processing monitoring unit 34. Stoppage of the processing operation in the processing unit 30 is regarded as occurrence of the error.

A determination information storing unit 37, when an error has occurred according to the error detecting unit 36, stores as determination information, from among multiple job signals and processing signals up until the error occurred, records from a job signal that was a trigger to the processing signal when the error occurred.

A determining unit 38 predicts occurrence of an error by determining whether or not there is agreement between the multiple records sequentially stored in the record storing unit 35 and the determination information that has been stored in the determination information storing unit 37.

When occurrence of an error is predicted by the determining unit 38, a processing content modifying unit 39 modifies the processing content of the processing unit 30 so as to differ from the records of the determination information. In the present exemplary embodiment, processing signal timing is corrected.

In the configuration of the multifunction machine 1, the operating unit 32 corresponds to the operating switch in the user interface 15, and the external input unit 33 corresponds to the fax interface 18 and the external interface 19.

(3-2) Determination Information Collecting Unit

Figure 5:
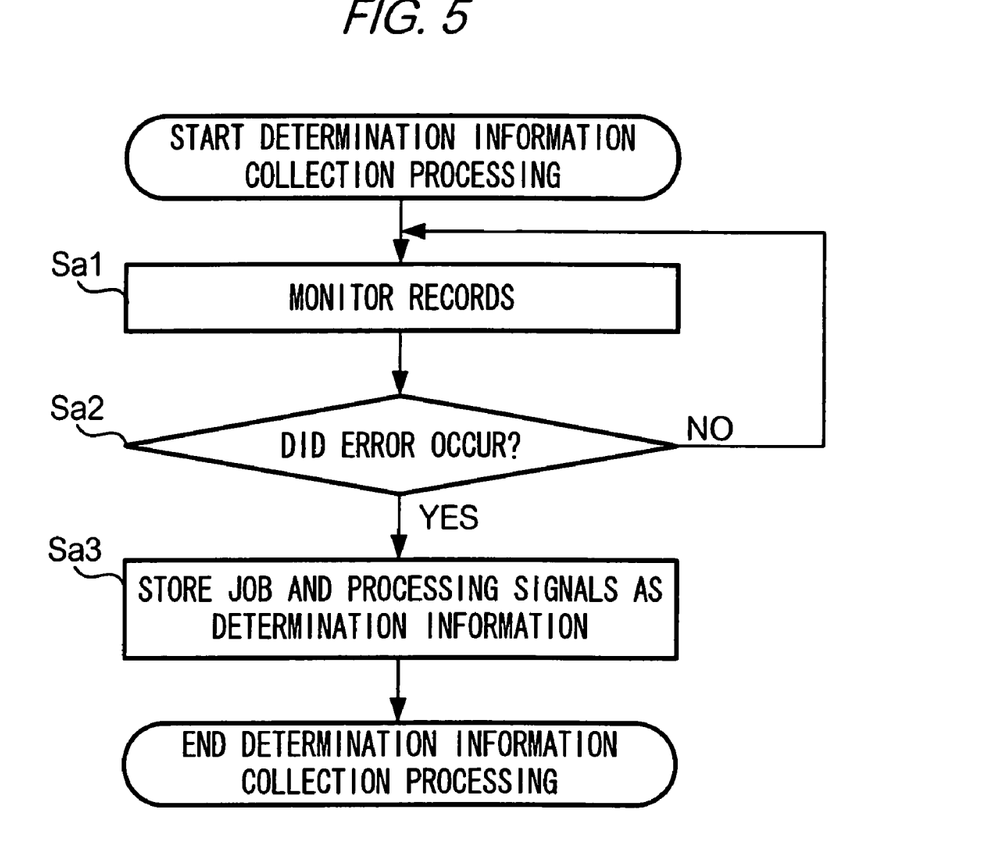
FIG. 5 is a flow diagram that shows determination information collection processing in the exemplary embodiment shown in FIG. 1.

Next is a description of a determination information collecting unit that collects determination information, with reference to the flowchart in FIG. 5.

The controller 10 monitors operation of the processing unit 30 with the error detecting unit 36 (Step Sa1), and determines whether or not an error has occurred with the determining unit 38 (Step Sa2). While an error has not occurred (NO in Step Sa2), the processing of Steps Sa1 and Sa2 is repeated.

When an error has occurred (YES in Step Sa2), the job signal and the processing signals up until the error occurred are stored as determination information in the RAM 12 (Step Sa3). This determination information collection processing is always caused to operate when performing picture data processing.

Figure 4:
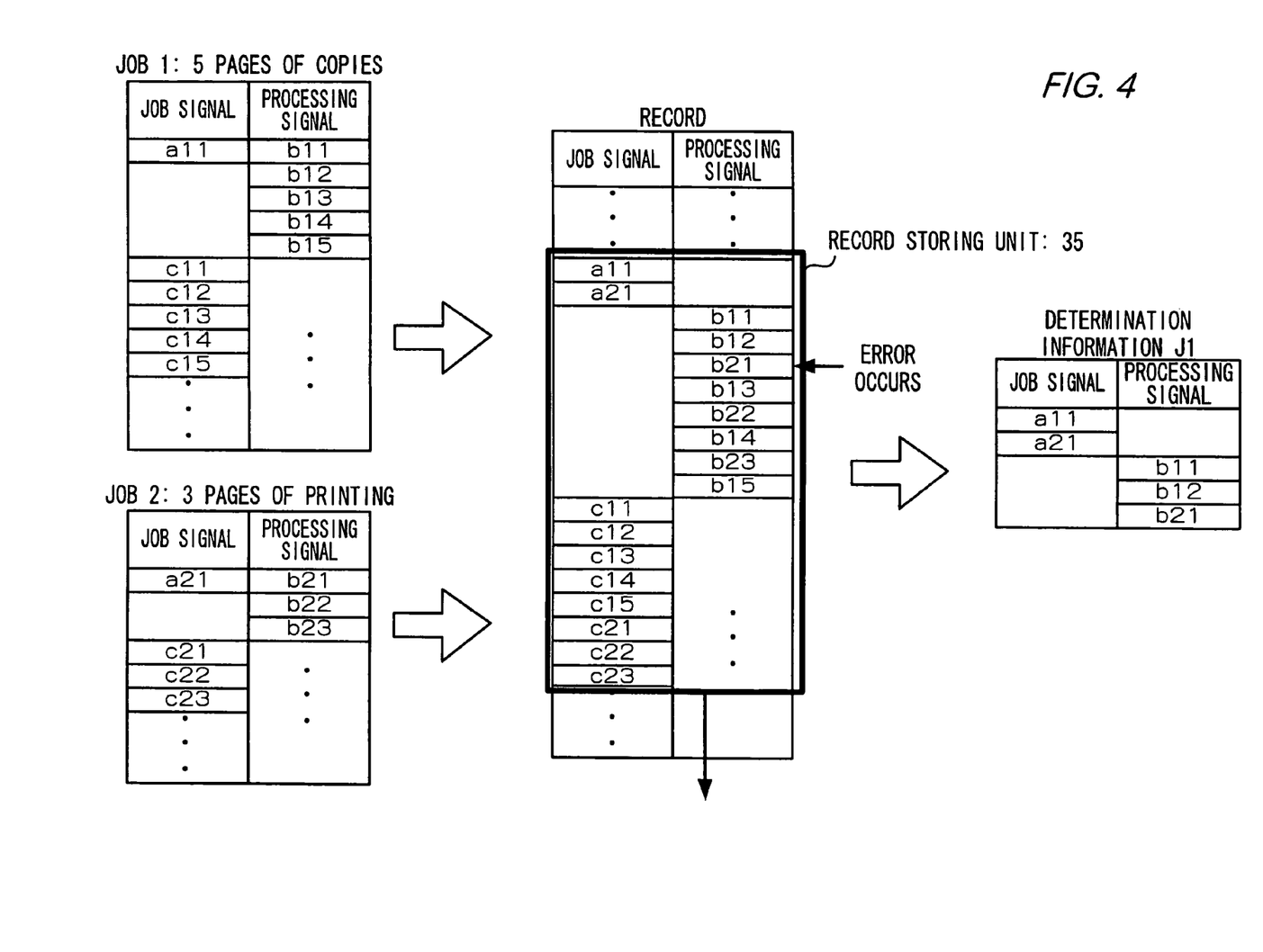
FIG. 4 shows jobs, records, and determination information in the exemplary embodiment shown in FIG. 1.

A specific example of determination information is shown in FIG. 4.

First, in the processing operation shown in FIG. 3, the processing signal b21 of Job 2 overlaps the processing signal b13 of Job 1. In this case, in the processing unit 30, during image processing by the processing signal b21, an error occurs due to overlapping when processing by the processing signal b13 attempts to interrupt. When this error occurrence has been detected with the error detecting unit 36, the determination information storing unit 37 stores the sequence (i.e., the chronological order of records) from the job signal that was the trigger of this error to the processing signal where the error occurred as determination information J1 (see FIG. 4). That is, the determination information J1 includes the job signal a11 (five pages of copies), the job signal a21 (three pages of printing), and the processing signals b11, b12, and b13.

In this determination information collection processing, in order to operate, the determination information is sequentially accumulated each time that an error occurs in the processing unit 30.

(3-3) Error Avoidance Processing

Figure 6:
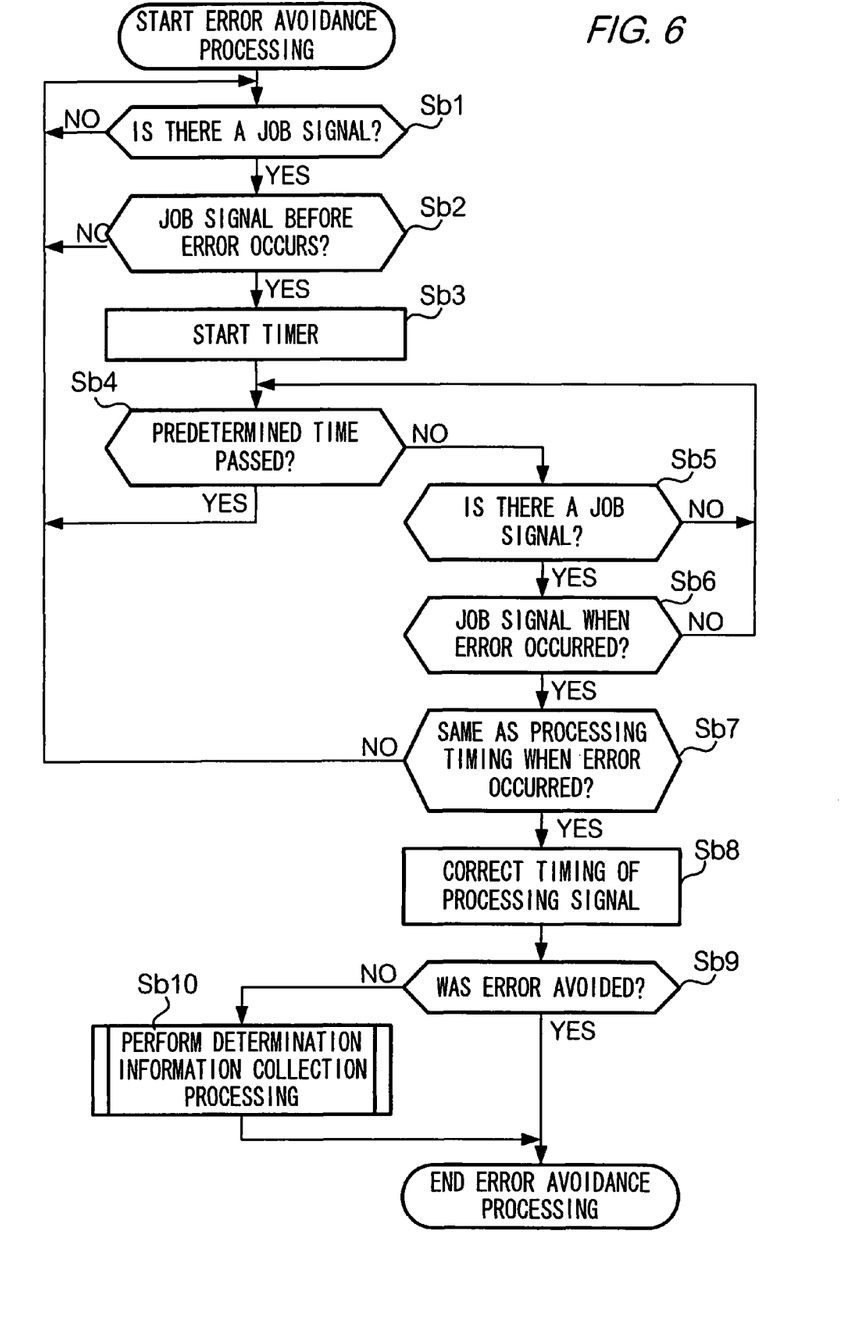
FIG. 6 is a flow diagram that shows error avoidance processing in the exemplary embodiment shown in FIG. 1.

Next is a description of error avoidance processing, with reference to the flowchart in FIG. 6.

In this description, a case is described in which error avoidance is performed based on the determination information J1.

First, the controller 10 monitors the job signals sequentially stored in the record storing unit 35, determines whether or not there is a job signal (Step Sb1), and waits at Step Sb1 until a job signal is detected.

When a job signal is detected (YES in Step Sb1), the controller 10 determines whether or not there is a job signal before error occurrence. That is, the controller 10 determines whether or not the detected job signal is the same as the job signal a11 of the determination information (five pages of copies). If the job signal differs (NO in Step Sb2), the processing moves to Step Sb1.

On the other hand, when the detected job signal is the same as the job signal a11 of the determination information (YES in Step Sb2), the controller 10 starts a timer (Step Sb3), and determines whether or not a predetermined period of time has passed (Step Sb4). When the predetermined period of time has passed (YES in Step Sb4), the processing moves to Step Sb1. The predetermined period of time is a time difference between the job signals a11 and a21, and when a job signal has not been detected after passage of this time period, there is no possibility that an error will occur, so processing returns to the initial step.

When the timer is within the predetermined time period (NO in Step Sb4), the controller 10 determines whether or not a next job signal is stored in the record storing unit 35 (Step Sb5). When there is not a job signal (NO in Step Sb5), the processing in Step Sb4 and thereafter is repeated.

When a job signal is detected (YES in Step Sb5), the controller 10 determined whether or not the job signal is a job signal when an error occurred (Step Sb6). That is, the controller 10 determines whether or not the detected job signal is the same as the job signal a21 of the determination information (three pages of printing). If the job signal differs (NO in Step Sb6), the processing in Step Sb4 and thereafter is repeated.

On the other hand, when the detected job signal is the same as the job signal a21 of the determination information (YES in Step Sb6), the controller 10 determines whether or not the generation timing of the processing signal is the same (Step Sb7). In Step Sb7, the generation timing is compared for multiple processing signals. With this determination processing, it is understood whether or not there is a possibility that an error will occur.

When the generation timing is the same (YES in Step Sb7), the controller 10 performs processing that thins out the processing signal generation timing with the processing content modifying unit 39 (Step Sb8).

That is, in the case of the determination information J1, because an error is occurring in the processing signals b21 and b13 after the processing signals b11 and b12, the processing signals are thinned out before this error occurs.

Specifically, as shown in FIG. 3, the processing signal b21 of Job 2 is generated with a timing such that a time interval is formed between the processing signals b12 and b13 of Job 1, and likewise, correction signals are generated with a timing such that the processing signal b22 of Job 2 is generated in a time interval formed between the processing signals b13 and b14 of Job 1, and the processing signal b23 of Job 2 is generated in a time interval formed between the processing signals b14 and b15 of Job 1, and processing is executed by the processing unit 30 at this timing.

Further, stated in more detail, because the processing start time, end time, processing content, and the like are stored in the records of the processing signals stored in the record storing unit 35, in a case in which the processing signal indicated to the processing unit 30 has not reached the end time, a predetermined time period is formed and the next processing signal is indicated to the processing unit 30.

This predetermined period of time can also be controlled such that a time gap is gradually increased while monitoring whether or not an error will be avoided.

Further, the controller 10 determines whether or not the error has been avoided by this timing correction (Step Sb9), and when the error has been avoided (YES in Step Sb9), the error avoidance processing ends.

On the other hand, when the error has not been avoided (NO in Step Sb9) the controller 10 performs the aforementioned determination information collection processing (Step Sb10), and after the determination information is collected, this processing ends.

In this error avoidance processing, a case was described in which an error is avoided with respect to one unit of determination information, but in actuality, respective processing is performed for multiple units of determination information.

As apparent in the foregoing description, in the multifunction machine 1 according to the exemplary embodiment, when occurrence of an error is predicted by the determining unit 38, the timing of the processing signals in the processing unit 30 is modified by the processing content modifying unit 39 so as to differ from the determination information.

(5) Modified Example

In the above exemplary embodiment, by way of example, a case was described in which error avoidance processing is performed using the determination information generated when an error was produced by Jobs 1 and 2. However, the present invention is not limited to such a case; because job signals and processing signals when an error occurred are stored as determination information, it is also possible to generate determination information for an error that occurred with respect to three or more jobs. Also, determination corresponding to this determination information may be performed in the error avoidance processing.

Further, the determination information was configured using the records from the job signal that was the trigger of the error to the processing signal where the error occurred, but the determination information may also be configured using the records during a scheduled time or a predetermined time from the processing signal where the error occurred.

Also, the error described in the exemplary embodiment occurs due to a combination of a job signal and a processing signal, but the present invention is not limited to use in such a case, and is also used in a case in which an error has occurred due to a combination of job signals. That is, when an error has occurred due to a combination of job signals, the determination information is this combination of job signals. Thus, error avoidance can be realized due to the correction of the processing unit 30 in the error avoidance processing changing the order of the processing timing of the job signals.

On the other hand, even in a case in which an error occurred due to a combination of processing signals only, likewise, error avoidance can be realized due to due to the correction of the processing unit 30 in the error avoidance processing changing the order of the processing timing of the processing signals, or forming a gap between processing time periods.

Further, in the above exemplary embodiment, an example was described in which data processing serves as image processing, and a multifunction machine has this image processing, but the present invention is not limited thereto; the present invention can also be used in a computer or the like that executes a multitasking function that appropriately executes multiple kinds of processing.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
   a user interface that enables a user to input original data;
   an input device that receives original data;
   a processor that converts the original data input via the user interface or by the input device, so as to generate output data;
   a first monitoring unit that monitors operation of the user interface or the input device;
   a second monitoring unit that monitors processing of the processor;
   a first storage unit that sequentially stores in chronological order at least one of the operating records representative of an operation history of a user and processing the records representative of a process sequence of the processor;
   an error detecting unit that detects an error occurring in the second monitoring unit;
   a second storage unit that, when an error is detected by the error detection unit, stores determination information that includes a plurality of records stored in the first storage unit within a predetermined time period up until the error occurs, the plurality of records being arranged in chronological order;
   an error prediction unit that predicts occurrence of an error by determining whether there is agreement between the plurality of records sequentially stored in the first storage unit and the determination information stored in the second storage unit; and
   a process modifier that, when occurrence of an error is predicted by the error prediction unit, modifies the processing of the processor so as to cause the processor to become noncompliant to the records included in the determination information,
   wherein;
   the processor is configured to perform interruption processing in which a first process is executed during execution of a second process; and
   the process modifier is configured to determine whether a conflict between the first process and the second process occurs and, if the conflict occurs, adjust the interruption processing such that a time interval for the first process is formed and a time interval for the second process is formed.

2. The data processing apparatus according to claim 1,
   wherein the processor is configured to perform processing on divided data obtained by dividing the original data, and
   the process modifier adjusts processing timing of the processor, so as to restrict overlapping of two or more processes relating to the divided data.

3. The data processing apparatus according to claim 1, further comprising a timer, wherein:
   each of the plurality of records includes time information obtained by the timer; and
   the process modifier adjusts processing timing of the processor based on the time information.

4. A method of controlling a data processing apparatus including a user interface that enables a user to input original data; an input device that receives original data; and a processor that converts the original data input via the user interface or by the input device, so as to generate output data, the method comprising:

monitoring operation of the user interface or the input device;

monitoring processing of the processor;

sequentially storing in chronological order at least one of operating records representative of an operation history of a user and processing records representative of a process sequence of the processor;

detecting an error occurring in the processor;

storing, when an error is detected, determination information that includes a plurality of records that are stored within a predetermined time period up until the error occurs, the plurality of records being arranged in chronological order;

predicting occurrence of an error by determining whether there is agreement between the sequentially stored plurality of records and the stored determination; information;

modifying, when occurrence of an error is predicted, the processing of the processor so as to cause the processor to become noncompliant to the records included in the determination information;

performing interruption processing in which a first process is executed during execution of a second process; and     determining whether a conflict between the first process and the second process occurs and, if the conflict occurs, adjusting the interruption processing such that a time interval for the first process is formed and a time interval for the second process is formed.

5. An image processing apparatus comprising:

a user interface that enables a user to input original image data;

an input device that receives original image data;

a processor that converts the original image data input via the user interface or by the input device, so as to generate output image data;

a first monitoring unit that monitors operation of the user interface or the input device;

a second monitoring unit that monitors processing of the processor;

a first storage unit that sequentially stores in chronological order at least one of operating records representative of an operation history of a user and processing records representative of a process sequence of the processor;

an error detecting unit that detects an error occurring in the second monitoring unit;

a second storage unit that, when an error is detected by the error detection unit, stores determination information that includes a plurality of records that are stored in the first storage unit within a predetermined time period up until the error occurs, the plurality of records being arranged in chronological order;

an error prediction unit that predicts occurrence of an error by determining whether there is agreement between the plurality of records sequentially stored in the first storage unit and the determination information stored in the second storage unit; and a process modifier that, when occurrence of an error is predicted by the error prediction unit, modifies the processing of the processor so as to cause the processor to become noncompliant to the records included in the determination information, wherein:

the processor is configured to perform interruption processing in which a first process is executed during execution of a second process; and the process modifier is configured to determine whether a conflict between the first process and the second process occurs and, if the conflict occurs, adjust the interruption processing such that a time interval for the first process is formed and a time interval for the second process is formed.

\* \* \* \* \*